(12) United States Patent
Kalu et al.

(10) Patent No.: US 9,081,547 B2
(45) Date of Patent: Jul. 14, 2015

(54) SYSTEM AND METHOD OF AUTOMATIC SWITCHING TO A TEXT-ENTRY MODE FOR A COMPUTING DEVICE

(75) Inventors: Kalu Onuka Kalu, Waterloo (CA); Laura Mahan, Kanata (CA); Jung-Chien Kevin Chuang, Port Coquitlam (CA)

(73) Assignee: BlackBerry Limited, Waterloo, Ontario (CA)

( * ) Notice: Subject to any disclaimer, the term of this patent is extended or adjusted under 35 U.S.C. 154(b) by 190 days.

(21) Appl. No.: 13/274,819

(22) Filed: Oct. 17, 2011

(65) Prior Publication Data

US 2013/0093686 A1    Apr. 18, 2013

(51) Int. Cl.
| G06F 3/044 | (2006.01) |
|---|---|
| G06F 1/16 | (2006.01) |
| G09G 5/00 | (2006.01) |
| G06F 3/038 | (2013.01) |
| G06F 3/041 | (2006.01) |
| G06F 3/0488 | (2013.01) |

(52) U.S. Cl.
CPC .............. *G06F 1/1654* (2013.01); *G06F 3/038* (2013.01); *G06F 3/0416* (2013.01); *G06F 3/04883* (2013.01); *G06F 3/04886* (2013.01); *G09G 5/00* (2013.01)

(58) Field of Classification Search
CPC ... G06F 3/041; G06F 3/04886; G06F 1/1654; G06F 3/038; G06F 3/04883; G06F 3/0416; G09G 5/00
USPC .......................................................... 345/173
See application file for complete search history.

(56) References Cited

U.S. PATENT DOCUMENTS

| 2008/0165149 | A1 | 7/2008 | Platzer |
|---|---|---|---|
| 2008/0174570 | A1* | 7/2008 | Jobs et al. ...................... 345/173 |
| 2009/0213081 | A1 | 8/2009 | Case |
| 2009/0227293 | A1 | 9/2009 | Yulo |
| 2010/0151846 | A1 | 6/2010 | Vuong |
| 2011/0043326 | A1* | 2/2011 | Lee et al. ........................ 340/5.8 |
| 2011/0138444 | A1* | 6/2011 | Kang et al. ....................... 726/3 |
| 2012/0112998 | A1* | 5/2012 | Morris et al. .................. 345/157 |

OTHER PUBLICATIONS

Extended European Search Report mailed Dec. 27, 2011. In corresponding application No. 11185506.0.
The International Search report and the Written Opinion mailed Dec. 5, 2011, in corresponding PCT patent application No. PCT/CA2011/050653.
Examination report mailed Feb. 8, 2013, in corresponding European patent application No. 11185506.0.
Office Action mailed Oct. 20, 2014; in Canadian patent application No. 2,827,738.
International Preliminary Report on Patentability in International Application No. PCT/US2011/050653, mailed May 1, 2014, 7 pages.

* cited by examiner

*Primary Examiner* — Towfiq Elahi
(74) *Attorney, Agent, or Firm* — Fish & Richardson P.C.

(57) ABSTRACT

A first device such as a portable or handheld electronic computing device can be configured to act as a text-entry device and a cursor control device for a second device. The first device can include a touch-sensitive display capable of receiving text inputs and cursor inputs for controlling the display of a second device which is communicatively coupled to the first device. The first device can be configured such that selection of certain items such as a text-entry field displayed by the second device can cause the first device to switch or change from a text-entry mode to a cursor control mode.

15 Claims, 8 Drawing Sheets

SYSTEM AND METHOD OF AUTOMATIC SWITCHING TO A TEXT-ENTRY MODE FOR A COMPUTING DEVICE

FIELD OF TECHNOLOGY

The present disclosure relates generally to the use of a first electronic device to control a display of a second electronic device, and more specifically, to a system and method of automatically switching data entry modes on a first device based on selections displayed on a first device.

BACKGROUND

Tablet computers are tablet-sized computers that can have many features of a larger full-size personal computer. Tablet computers can be communicatively coupled to an electronic device such as a handheld device like a smart phone. An electronic device can be configured to receive input signals which are used to control the actions of a tablet computer. An electronic device can have a text-entry mode, in which it can accept text input, and a cursor mode, in which it can accept input corresponding to the control of cursor. An electronic device can be configured to switch modes depending on actions which occur on the tablet but which are controlled by the electronic device.

Thus, an electronic device can act as a cursor navigation tool for a cursor displayed on the display on a tablet computer. Also, an electronic device can act as a text-entry tool for entering text which is displayed on the tablet computer. An electronic device with a touch sensitive display can be configured to receive touch inputs which can control the position of a cursor on the display of a tablet. The electronic device can be configured such that if a text-entry field on the display of a tablet is selected via the device in a cursor mode, the device will switch to a text-entry mode in which a virtual keyboard is displayed. The virtual keyboard can be used to select characters which can be displayed by the tablet computer.

BRIEF DESCRIPTION OF THE DRAWINGS

In order to describe the manner in which the features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the scope of the disclosure.

Several definitions that apply throughout this document will now be presented. The phrase "coupled" is defined as connected, whether directly or indirectly through intervening components and is not necessarily limited to physical connections. Coupled devices are devices which are in signal communication with one another.

The term "computing device" is defined as any device that is capable of at least accepting data, transmitting data, and executing commands. For example, computing devices can include, but are not limited to, portable communication devices, mobile communication devices, mobile computers, smartphones, computing pads, tablet computers, personal computers, desktop computers, laptop computers, netbooks, servers, routers, set-top phones, or other computing device capable of at least accepting data, transmitting data, and executing commands.

The term "text-entry mode" is defined as a mode for a device which enables the device receive, send, or process text-related commands such as to select or display text. The term "cursor control mode" is defined as a mode for a device which enables the device to receive, send, or process cursor controlling inputs or commands such as by a joy stick, optical navigation module, touch pad, touch-sensitive display, or the like. The term "text-entry field" is defined as an area displayed on the display of a device, the selection of which can be interpreted as indicative of a desire to input text to a device.

The term "character" is defined as a symbol, such as a number, letter or other shape and the like. The term "touch" means the contact of a finger, finger-tip, digit, or stylus and the like. A touch can include a sweep or other gesture. The term "item" is defined as an icon, symbol, or picture and the like.

Figure 1:
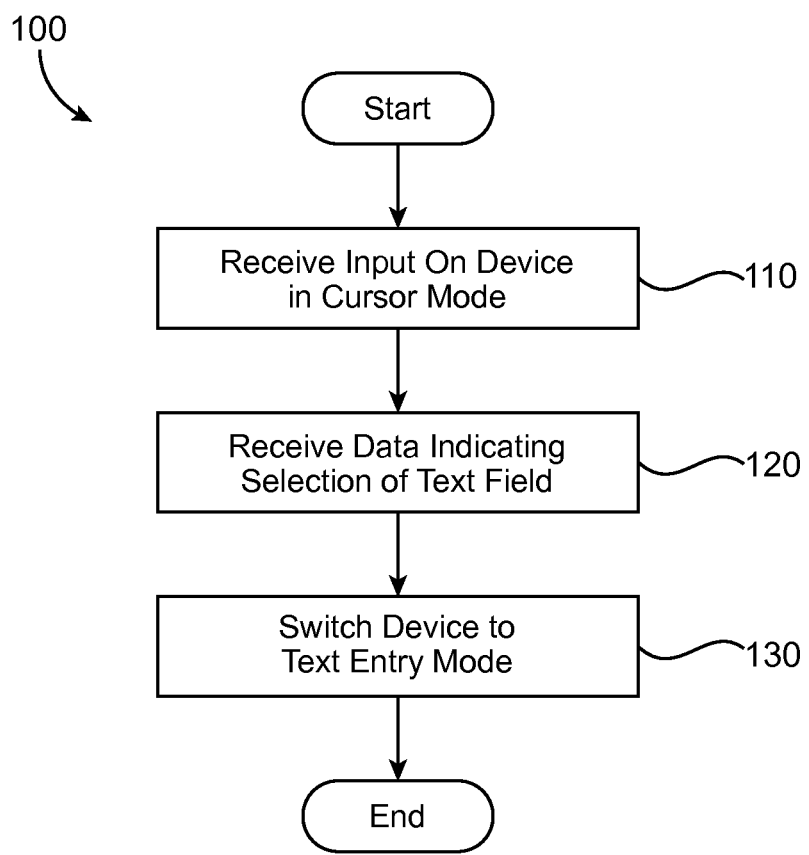
FIG. 1 is a flow chart of a method of switching a device from a cursor mode to a text-entry mode in accordance with an exemplary embodiment.

FIG. 1 is a flow chart of a method of switching a device from a cursor mode to a text-entry mode in accordance with an exemplary embodiment. The method 100 illustrated in FIG. 1 is provided by way of example, as there are a variety of ways to carry out the method. Additionally, while the exemplary method 100 is illustrated with a particular order of steps, those of ordinary skill in the art will appreciate that FIG. 1 and the steps illustrated therein can be executed in any order that accomplishes the technical advantages of the present disclosure and can include fewer or more steps than illustrated. Furthermore, the exemplary method 100 can be combined with the methods shown in FIGS. 2 and 3, as will be explained below.

Each block shown in FIG. 1 represents one or more processes, methods or subroutines, carried out in exemplary method 100. The steps illustrated in FIG. 1 can be implemented in a system including a first computing device coupled to a second computing device. For example, each block shown in FIG. 1 can be carried out by the processor of the computing device 430 illustrated in FIG. 2. The flow chart illustrated in FIG. 1 will be described in relation to and make reference to the first computing device 430 and the second computing device 400 illustrated in FIG. 4. In the example discussed in the next paragraph, inputs on the first device can be used to at least partially control the second device.

In FIG. 1, the method 100 can begin at block 110. When the method 100 starts a first device is in a cursor mode, which is a mode in which inputs on the first device can be used to control the position of the cursor on a second device. At block 110, an input is received by a first device. The input can be, for example, a touch contact on a touch-sensitive display of the first device. The input can be transmitted away from the first device to control the display of the second device. For example movements along a touch-sensitive display on the first device can cause a cursor displayed on the display of the second device to change position. Thus, for example, a change in the position of a finger on the touch-sensitive display can cause a corresponding change in position of a cursor on the display of the second device. Inputs on the first device in the cursor mode can be used to make selections of selectable items displayed on the display of the second device. For example, at block 110 an input can be received which selects an item displayed on the display of the second device. The input can be, for example, the selection of a text-entry field displayed on the display of the second device. Although the discussion of the method 100 illustrated in FIG. 1 uses the example of selection of a text-entry field as an indication of a desire to enter text, other inputs and selections are possible within this disclosure, as will be explained below. Once the input received at block 110 has been transmitted away from the first device for selecting a text-entry field on the second device, the second device can send a signal to the first device indicating that the text-entry field has been selected, and the method can proceed to block 120.

At block 120, the first device receives data which can be carried by a signal from the second device indicating that a selection of a text-entry field has occurred. Once data indicating selection of a text-entry field (or otherwise indicating a desire to use the second device to enter text) has been received by the second device, the method can proceed to block 130.

At block 130 the first device can switch from a cursor mode to a text-entry mode. The first device can be configured to display selectable characters on a touch-sensitive display when the first device is in the text-entry mode. Displaying selectable characters can consist of, for example, displaying a virtual keyboard or virtual keypad or both. Thus, at block 130, the first device switches from a mode in which it acts as a cursor control mechanism for the second device, to a mode in which is acts as a text-entry mechanism for the second device, as will be explained with reference to FIG. 2. (When the first device is in the text-entry mode, the first device can be switched to a cursor control mode, as will be explained with reference to FIG. 3.)

Figure 2:
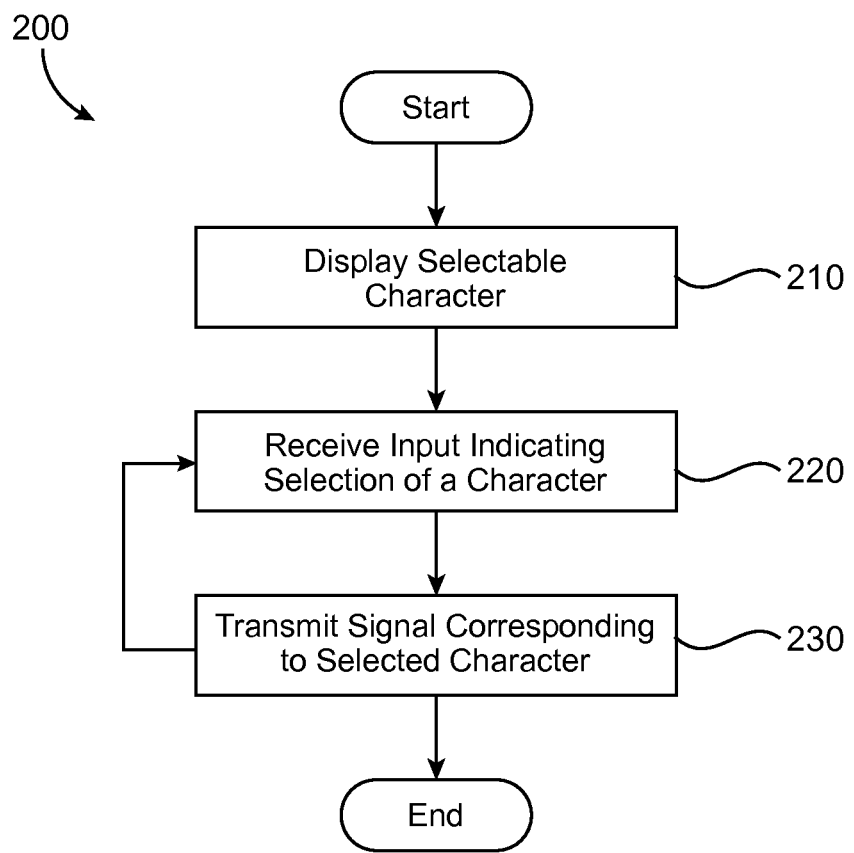
FIG. 2 is a flow chart of a method of entering text on a first device for display on a second device in accordance with an exemplary embodiment.

FIG. 2 is a flow chart of a method 200 entering of text on a first device for display on a second device in accordance with an exemplary embodiment. Continuing with the example discussed in regard to FIG. 1, the method 200 pertains to a first device which is in a text-entry mode. The first device can be in a text-entry mode because it was switched to a text-entry as in block 130. At block 210, the first device can display selectable characters on a touch-sensitive display. Once one or more selectable characters are displayed on the display of the second device, the method can proceed to block 220.

At block 220, the first device can receive input indicating selection of a displayed character. The input indicating selection of displayed character can consist of a touch or tap or other input used to convey a selection on the first device. Once a selection of a character has occurred, the method can proceed to block 230.

At block 230, the first device sends a signal to a corresponding to a selected character. The signal can be received by a second device. After the second device receives the signal corresponding to selection of a character on the first device, the second device can, as a result, cause the selected character to be displayed on the display screen of the second device. It will be understood that by performing the functions at block 220 and 230 multiple times, method 200 enables the second device to act as a text-entry mechanism for the second device. It will further be understood that the second device is considered to be in a text-entry mode throughout performance of method 200. When the first device is in the text-entry mode, the first device can be switched to a cursor control mode, as will be explained with reference to FIG. 3.

Figure 3:
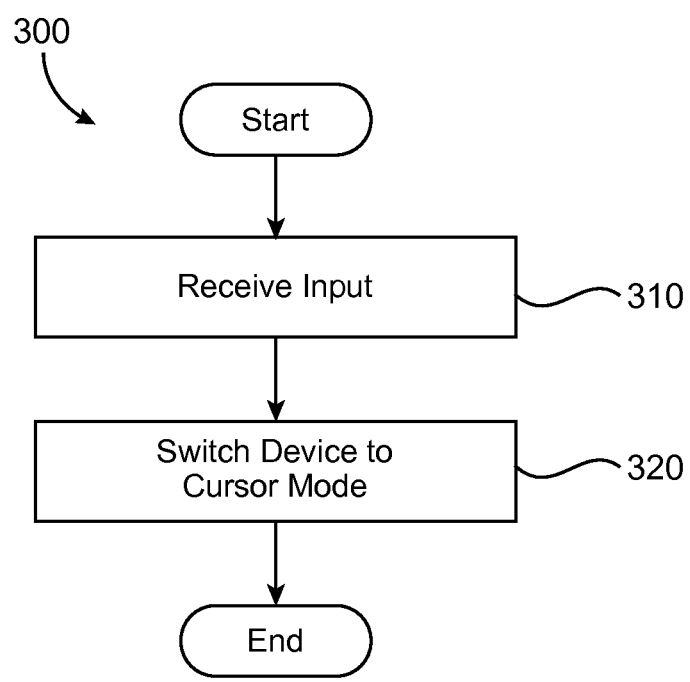
FIG. 3 is a flow chart of a method of switching a device from a text-entry mode to a cursor mode.

FIG. 3 is a flow chart of a method 300 of switching a first device from a text-entry mode for entering text to a second device to a cursor control mode for controlling a cursor on a second device. As explained above, when the first device is in a text-entry mode it can display selectable characters in a virtual keyboard. At block 310, when the first device is in a text-entry mode, the first device can receive at least one input indicating a desire to use the first device as a cursor control mechanism for a second device. The input can consist of a certain type of touch, for example a sweep from one portion of a touch sensitive display to another portion of the touch sensitive display, or a sequence of taps. It will be understood that other types of touches are possible within this disclosure. As will be further explained, the input can also consist of a touch on a particular portion of the touch sensitive display or can be an actuation of an actuable input device, such as, for example, the depression of an escape button or a return button, or a navigation tool such as an optical navigation unit, or any combination thereof. It will be understood that other types of inputs indicating a desire or intent to use the first device as a cursor control mechanism for a second device are possible within this disclosure. When such an input is received by the first device the method proceeds to block 320.

At block 320 the first device switches from a text-entry mode to a cursor control mode. As explained above, when the first device is in a cursor control mode, inputs on the first device are used to control the actions of a cursor displayed on a second device. As explained with reference to FIG. 1, when the first device is in the cursor control mode the first device can be switched back to the text-entry mode using method 100.

Figure 4:
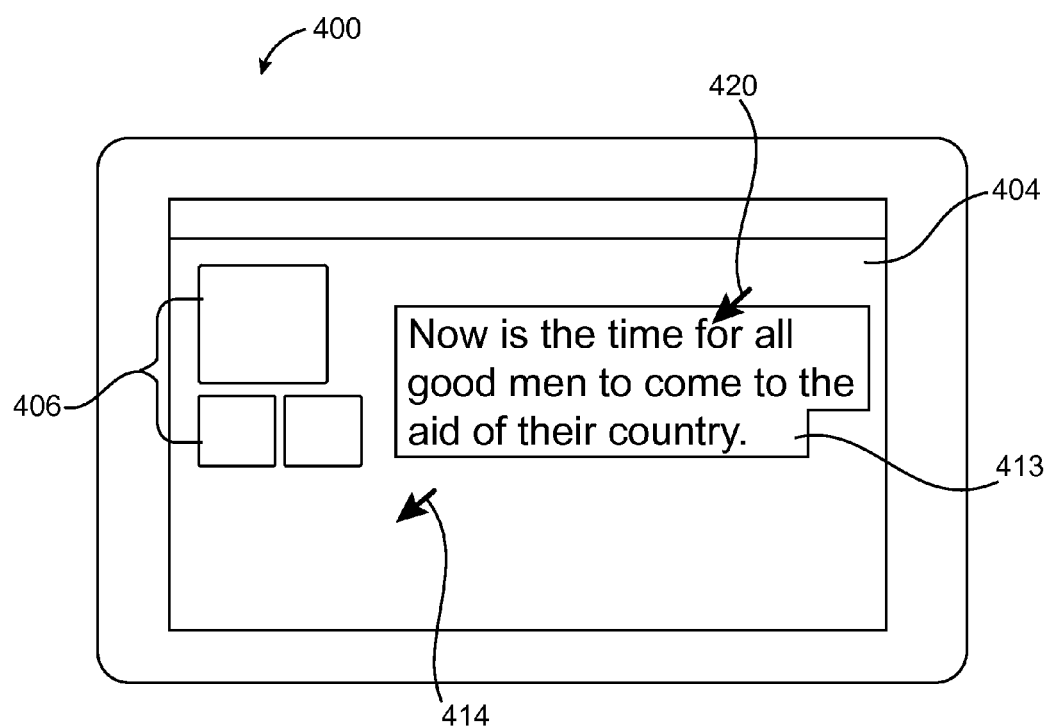
FIG. 4 illustrates moving a cursor on a second device in response to an input received on a first device in accordance with an exemplary embodiment.
Figure 4:
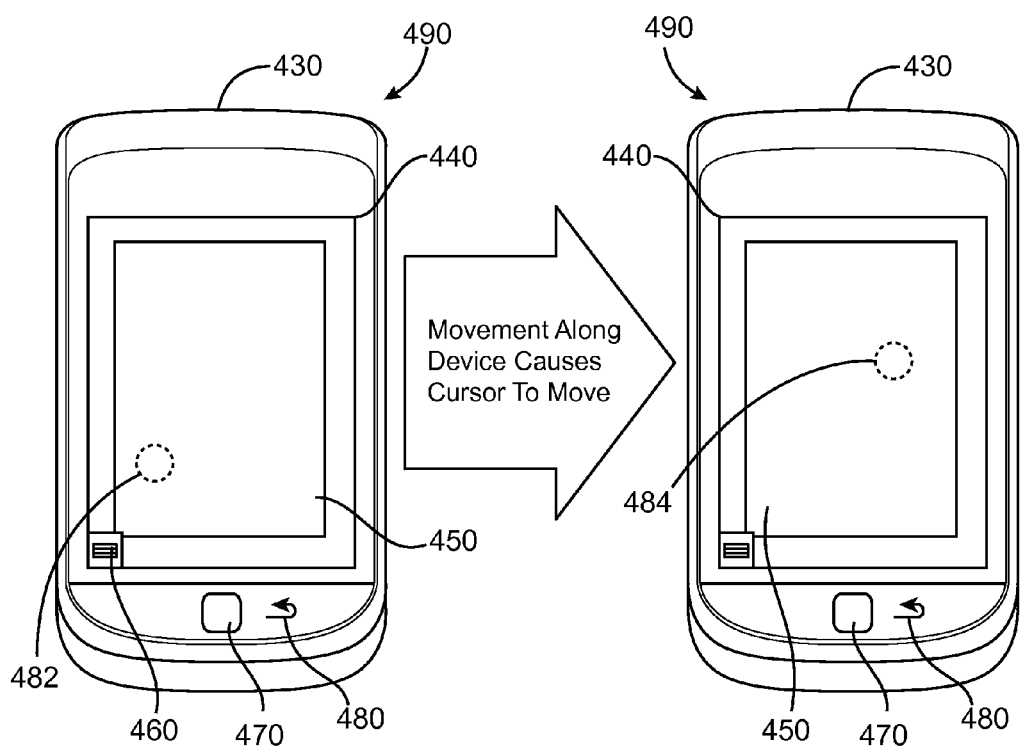

FIG. 4 illustrates a first device 430 coupled to a second device 400. The first device 430 is in a cursor control mode 490 in which inputs on the first device 430 control the display 404 of the second device 400. Controlling the display 404 of the second device 430 can include controlling a cursor (e.g. 414) on the display 404. One way a cursor (e.g. 414) can be caused to move is by moving a finger, finger-tip or stylus from one position (e.g. 482) along a touch-sensitive display 440 of the first device 430 to a second position 484. In the example illustrated in FIG. 4, movement from position 482 to position 484 on the display 440 of the first device 430 causes the cursor on the display 404 of the second device 400 to move from position 414 to position 420. The touch-sensitive display 440 of the first device 430 can contain a smaller area 450 which acts like a virtual mouse-pad for receiving inputs for directing cursor actions.

The cursor on the display 404 can be moved to any area of the display 404. The cursor can be moved to selectable items 406 on the display 404 or to a text-entry field 413 on the display 404. Selectable items 406 can include a text-entry icon. If such a selectable item 406 is selected by actions on the first device 430 this can cause the first device to switch to a text-entry mode. Another way that a first device 430 can be caused to switch to a text-entry mode is by actuating the virtual mouse pad 450 of the first device 430 in a particular manner when the cursor (e.g. 420) is in contact with a text-entry field 413. Actuating the virtual mouse pad 450 can include a tap, or double tap or other suitable action on the touch-sensitive display 440 of the first device.

As illustrated in FIG. 4, a touch display 440 of a first device 430 can display a selectable item 460. The first device 430 can be configured to switch to a text-entry mode if the selectable item 460 is selected by a suitable input such as a touch on the area of the touch-sensitive display 440 depicting item 460. The first device 430 can also include one or more actuable devices such as a navigation tool 470 and a return or escape button 480. The first device can be configured to toggle between a cursor control mode 490 and a text-entry mode in response to actuation of actuable devices such as 470 and 480. Additionally, the first device 430 can include a physical keyboard or keypad (not shown) and the first device 430 can be configured to switch to a text-entry mode 490 when one or more of the keys are actuated.

Figure 5:
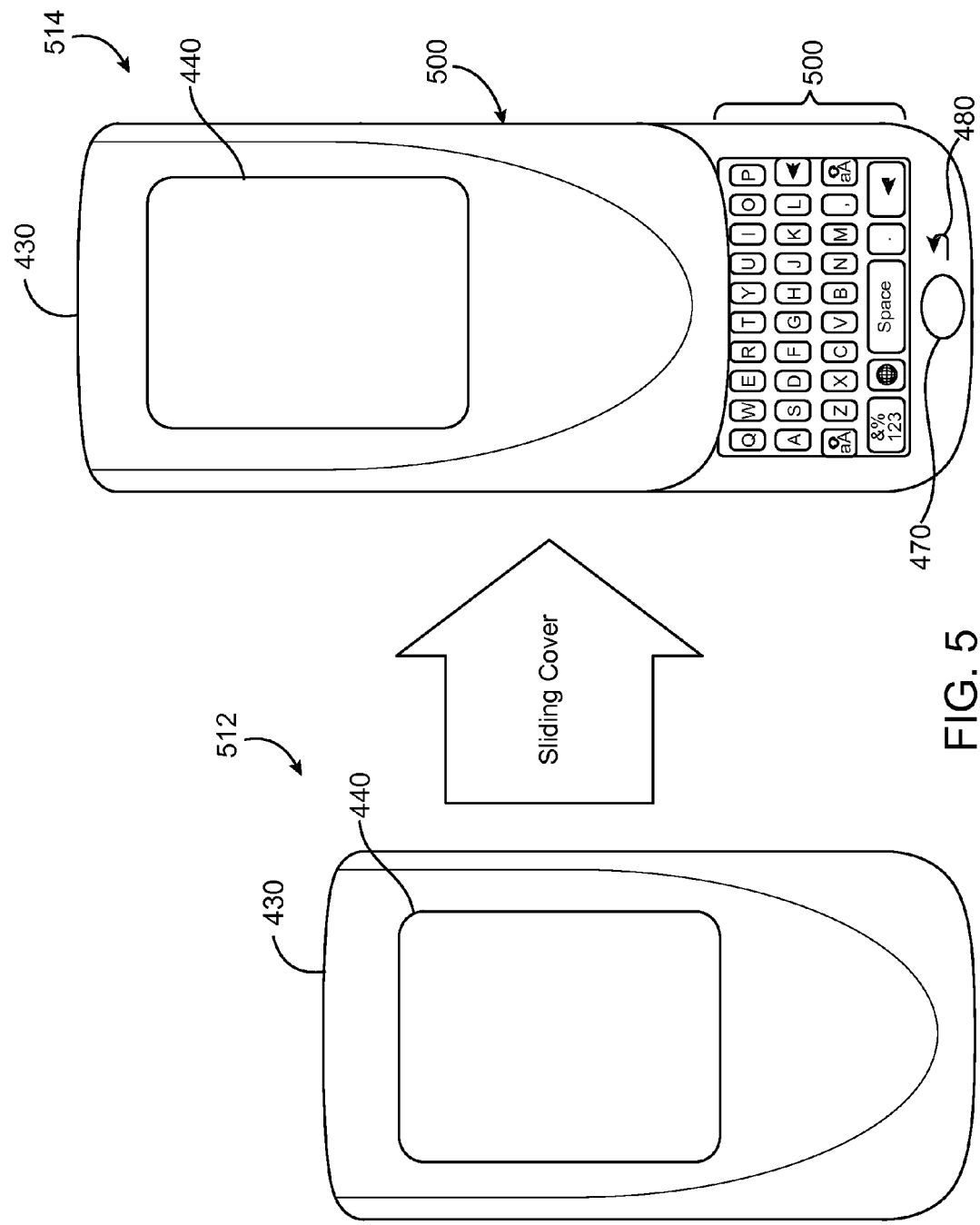
FIG. 5 illustrates switching a device to a text-entry mode in response to exposing a physical keyboard of the device in accordance with an exemplary embodiment.

FIG. 5 illustrates a first device 430 switching to a text-entry mode 520 as a result of exposing a keyboard 500. If the first device 430 is a slider device in which a keyboard 500 or keypad (or both) is at least partially covered when the first device 430 is in a closed configuration 512, the first device 430 can be configured to enter a text-entry mode 520 when some or all of the keys of a keyboard 500 are exposed by moving the first device 430 towards an open configuration 514.

Figure 6:
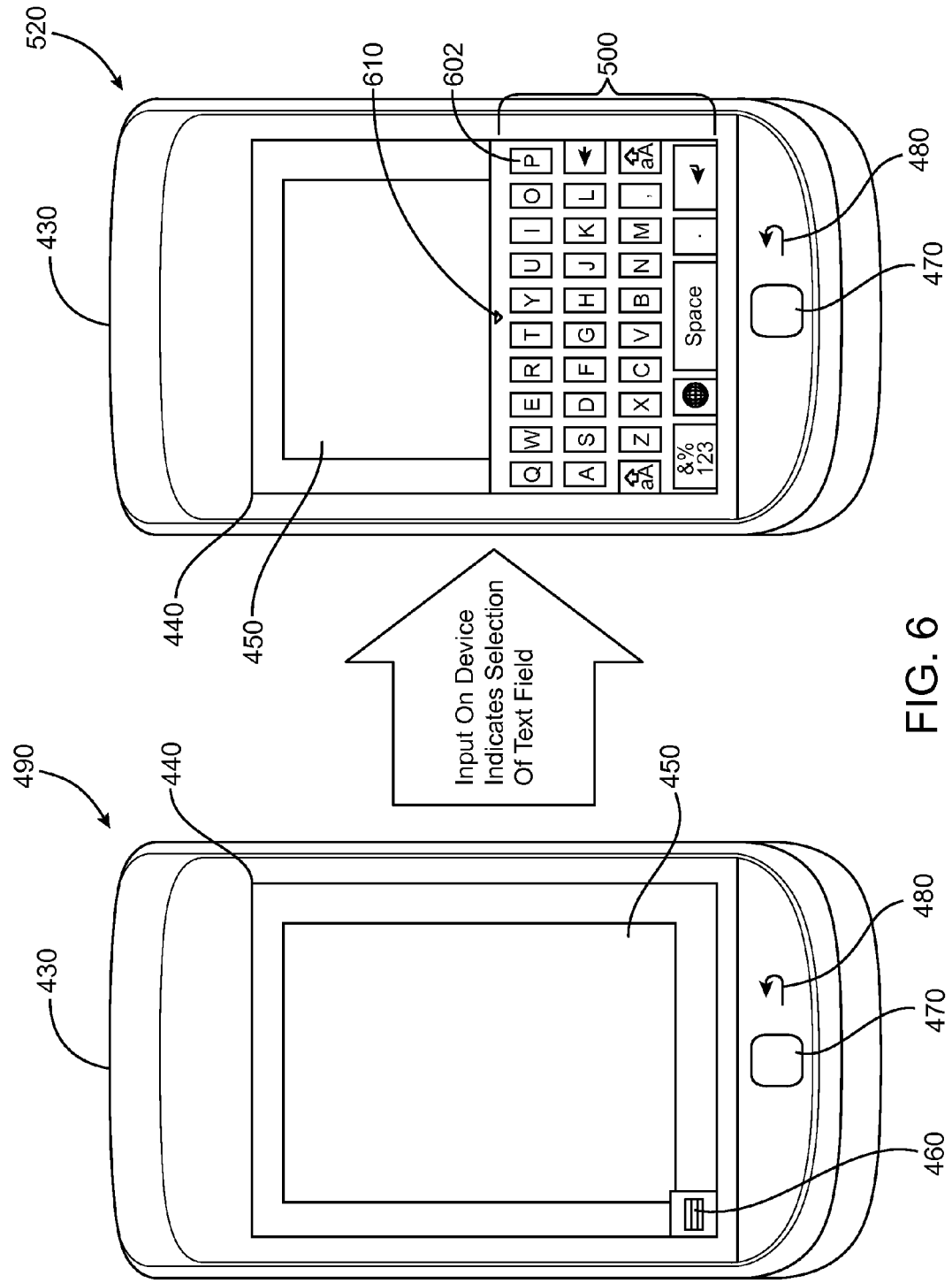
FIG. 6 illustrates switching a device from a cursor mode to a text-entry mode in response to an input in accordance with an exemplary embodiment.

FIG. 6 illustrates a first device 430 switching from a cursor control mode 490 to a text-entry mode 520 in response to an input on the first device 430 indicative of a desire to enter text for display on a second device 400. Various types of actions on the first device 430 can cause the first device 430 to switch from a cursor control mode to a text-entry mode 520. For example, if the cursor 420 on the second device 400 is in contact with the text-entry field on the display 404 of the second device 400, an input such as, for example, a prolonged touch or double tap on the touch-sensitive display 440 of the first device 430 this can cause the first device 430 to enter a text-entry mode 520. Furthermore, as discussed above with reference to FIG. 4, first device 430 can be configured to switch to a text-entry mode 520 if a selectable item 460 is selected by a suitable input such as a touch on the area of the touch-sensitive display 440 depicting item 460. The first device 430 can also include one or more actuable devices such as a navigation tool 470 and a return or escape button 480 which, when activated or actuated when the first device is in the a cursor control mode 490, can cause the first device 430 to switch to a text-entry mode 520.

When the first device 430 is in a text-entry mode 520, the first device 430 can display selectable characters (e.g 502). Displaying selectable characters can include displaying a virtual keyboard 500 or a virtual keypad (not shown). As discussed above, when the first device 430 is in a text-entry mode 520 selection of characters (e.g. 502) on the first device 430 can cause the display 440 of a second device 400 to display the selected characters. Thus when the first device 430 is in a text-entry mode 520 it can act as a keyboard or keypad for the second device 400, as discussed in reference to FIG. 2. The device 430 can be configured to display at least one selectable icon 610 which can be actuated to switch the device 430 back to a cursor control mode 490.

Figure 7:
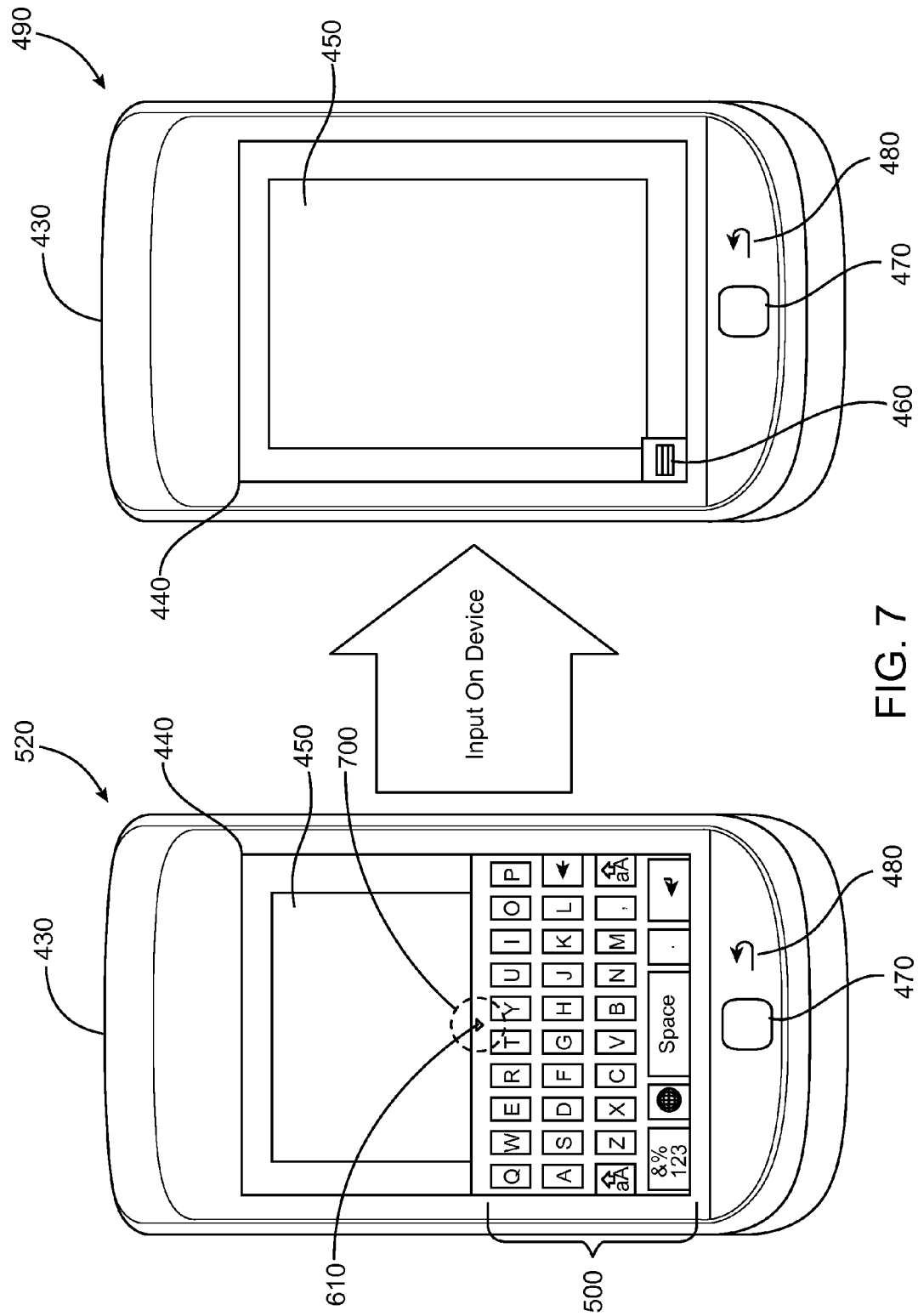
FIG. 7 illustrates switching a device from a text-entry mode in response to an input in accordance with an exemplary embodiment.

FIG. 7 illustrates a first device 430 switching from a cursor control mode 490 to a text-entry mode 520 in accordance with an exemplary embodiment. The first device 430 can be configured to display a selectable or actuable icon 610 when the first device 430 is in a text-entry mode 520. Selection or actuation of the icon 610, as by a touch or other suitable input, can cause the first device 430 to switch from a text-entry mode 520 to a cursor control mode 490, as illustrated in FIG. 7. As illustrated in FIG. 7, a touch in the region 700 surrounding the icon 610 can cause the first device 430 to switch to a cursor control mode 490. As discussed above, other actions may cause the first device 430 to switch modes, such as suitable inputs on a navigation tool 470 or actuation of a return or escape button 480.

Figure 8:
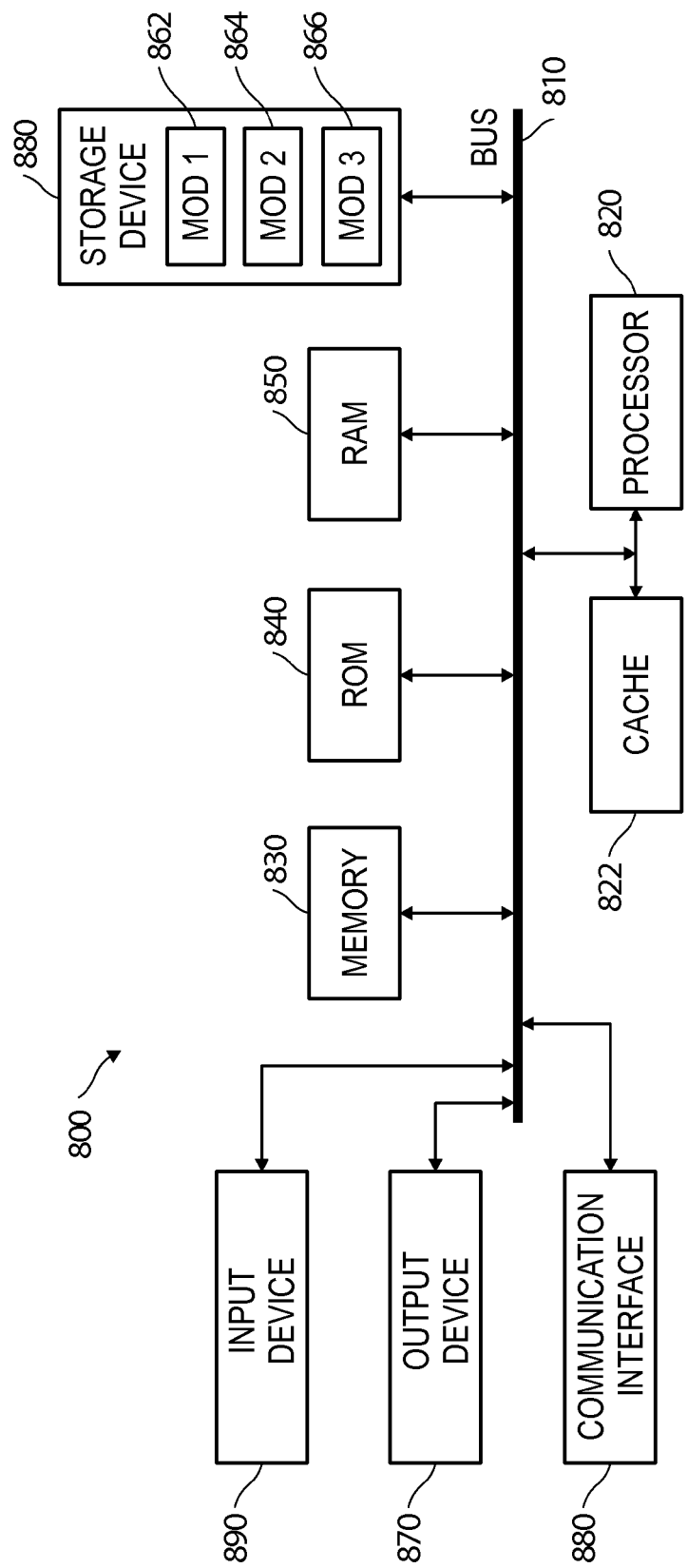
FIG. 8 illustrates a computing device system in accordance with an exemplary embodiment.

The disclosure now turns to a brief description of a computing device, as shown in FIG. 8, which can be employed to practice the concepts is disclosed herein. The components disclosed herein can be incorporated in whole or in part into tablet computers, personal computers, handsets, transmitters, servers, and any other electronic or other computing device.

With reference to FIG. 8, an exemplary system 800 includes a general-purpose computing device 800, including a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800 (e.g. 400, 430), such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 470 (e.g. 402, 440), and so forth, to carry out the function. The basic components are known to those of skill in the art and appropriate variations are contemplated depending on the type of device, such as whether the device 800 is a small, handheld computing device, a desktop computer, or a computer server.

Although the exemplary embodiment described herein employs the hard disk 860, it should be appreciated by those skilled in the art that other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 800, an input device 890 (e.g., 440, 460, 470, 480, 510) represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 8 is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 8 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 8 illustrates three modules Mod 1 862, Mod 2 864 and Mod 3 866 which are modules configured to control the processor 820. These modules may be stored on the storage device 860 and loaded into RAM 850 or memory 830 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply not only to a smartphone device but to other devices capable of receiving communications such as a laptop computer. Those skilled in the art will readily recognize various modifications and changes that may be made to the principles described herein without following the example embodiments and applications illustrated and described herein, and without departing from the scope of the disclosure.

We claim:

1. A method comprising:
   at a first time, receiving a first input on a display screen of a first communications device operating in a cursor mode, the first input being used to control a cursor position on a display of a second device and causes the cursor to move from a first position on the display to a second position on the display of the second device;
   at a second time, which is later than the first time, concurrently receiving a signal at the first communications device indicating selection of a text input field on the second device and a second input on the first communications device, the second input including a prolonged touch on the display screen;
   in response to concurrently receiving the signal and the second input received on the first communications device at a third time, which is later than the second time, generating a command at the first communications device to switch from the cursor mode to a text-entry mode;
   rendering at least one selectable character on the display screen of the first communication device;
   receiving at a fourth time, which is later than the third time, a third input on the first communications device, the third input indicating selection of the at the least one selectable character; and
   transmitting the second input received at the third time.

2. The method of claim 1, wherein the first input corresponds to at least one of a sweep and a tap on the display screen.

3. The method of claim 1, further comprising:
   switching the first communications device to the cursor mode, in response to the third input received at the fourth time.

4. The method of claim 1, wherein the third input being at least one of a touch-input on the display screen and an actuation of a button of the first communication device; and
   switching the first communications device to the cursor mode, in response to the third input received at the fourth time.

5. The method of claim 1, further comprising:
   receiving at a fifth time, which is later than the fourth time, a fourth input on the first communications device; and
   switching the first communications device to the cursor mode, in response to the fourth input received at the fifth time.

6. The method of claim 1, further comprising:
   receiving at a fifth time, which is later than the fourth time, a fourth input on a button of the first communications device; and
   switching the first communications device to the cursor mode in response to the fourth input received at the fifth time.

7. A first communications device for controlling a second device having a display, the first communications device comprising:
   a display screen;
   a processor; and
   a non-transitory computer readable storage medium storing instructions for controlling the processor to perform steps comprising:
   at a first time, receiving a first input on a display screen of the first communications device operating in a cursor mode, the first input being used to control a cursor position on the display of the second device and causes the cursor to move from a first position on the display to a second position on the display of the second device;
   at a second time, which is later than the first time, concurrently receiving a signal at the first communications device indicating selection of a text input field on the second device and a second input on the first communications device, the second input including a prolonged touch on the display screen;
   in response to concurrently receiving the signal and the second input received on the first communications device at a third time, which is later than the second time, generating a command at the first communications device to switch from the cursor mode to a text-entry mode;
   rendering at least one selectable character on the display screen of the first communication device;
   receiving at a fourth time, which is later than the third time, a third input on the first communications device, the third input indicating selection of the at the least one selectable character; and
   transmitting the second input received at the third time.

8. The first communications device of claim 7, wherein the first input corresponds to at least one of a sweep and a tap on the display screen.

9. The first communications device of claim 7, wherein the non-transitory computer readable storage medium further stores instructions for controlling the processor to perform steps comprising:
   switching the first communications device to the cursor mode, in response to the third input received at the fourth time.

10. The first communications device of claim 7, wherein the non-transitory computer readable storage medium further stores instructions for controlling the processor to perform steps wherein the third input being at least one of a touch-input on the display screen and an actuation of a button of the first communications device; and
    switching the first communications device to the cursor mode, in response to the third input received at the fourth time.

11. The first communications device of claim 7, wherein the non-transitory computer readable storage medium further stores instructions for controlling the processor to perform steps comprising:
    receiving at a fifth time which is later than the fourth time, a fourth input on the first communications device; and
    switching the first communications device to the cursor mode, in response to the fourth input received at the third time.

12. The first communications device of claim 7, wherein the non-transitory computer readable storage medium further stores instructions for controlling the processor to perform steps comprising:
    receiving at a fifth time, which is later than the fourth time, a fourth input on a button of the first communications device; and
    switching the first communications device to the cursor mode in response to the fourth input received at the fifth time.

13. A non-transitory computer-readable storage medium storing instructions which, when executed by a processor, cause an electronic device to:

at a first time, receive a first input on a display screen of the electronic device operating in a cursor mode, the first input being used to control a cursor position on a display of a second device and causes the cursor to move from a first position on the display to a second position on the display of the second device;

at a second time, which is later than the first time, concurrently receiving a signal at the first communications device indicating selection of a text input field on the second device and a second input on the first communications device, the second input including a prolonged touch on the display screen;

in response to concurrently receiving the signal and the second input received on the electronic device at a third time, which is later than the second time, generating a command at the electronic device to switch from the cursor mode to a text-entry mode;

rendering at least one selectable character on the display screen of the first communication device;

receiving at a fourth time, which is later than the third time, a third input on the first communications device, the third input indicating selection of the at the least one selectable character; and transmitting the second input received at the third time.

14. The non-transitory computer-readable storage medium of claim 13, further storing instructions which, when executed by the processor, cause the electronic device to move from the first position on the display to the second position on the display of the second device upon obtaining the first input corresponding to at least one of a sweep and a tap on the display screen.

15. The non-transitory computer-readable storage medium of claim 13, further storing instructions which, when executed by the processor, cause the electronic device to:

switch the electronic device to the cursor mode in response to the third input received at the third time.

* * * * *

UNITED STATES PATENT AND TRADEMARK OFFICE
CERTIFICATE OF CORRECTION

| | | |
|---|---|---|
| PATENT NO. | : 9,081,547 B2 | Page 1 of 1 |
| APPLICATION NO. | : 13/274819 | |
| DATED | : July 14, 2015 | |
| INVENTOR(S) | : Kalu et al. | |

It is certified that error appears in the above-identified patent and that said Letters Patent is hereby corrected as shown below:

In the claims

Column 9, Line 28, Claim 1, delete "communication" and insert -- communications --, therefor.

Column 9, Line 31, Claim 1, delete "at the" and insert -- at --, therefor.

Column 9, Line 43, Claim 4, delete "communication" and insert -- communications --, therefor.

Column 10, Line 21, Claim 7, delete "communication" and insert -- communications --, therefor.

Column 10, Line 24, Claim 7, delete "at the" and insert -- at --, therefor.

Column 11, Line 19, Claim 13, delete "communication" and insert -- communications --, therefor.

Column 12, Line 3, Claim 13, delete "at the" and insert -- at --, therefor.

Signed and Sealed this
Sixteenth Day of February, 2016

Michelle K. Lee
*Director of the United States Patent and Trademark Office*